United States Patent
Jabori et al.

(10) Patent No.: US 10,355,524 B2
(45) Date of Patent: Jul. 16, 2019

(54) ELECTRONIC DEVICES FOR WIRELESS CHARGING

(71) Applicant: HEWLETT-PACKARD DEVELOPMENT COMPANY, L.P., Houston, TX (US)

(72) Inventors: Monji G Jabori, Houston, TX (US); David Isaac Blatt, Houston, TX (US)

(73) Assignee: Hewiett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/748,380

(22) PCT Filed: Jan. 29, 2016

(86) PCT No.: PCT/US2016/015611
§ 371 (c)(1),
(2) Date: Jan. 29, 2018

(87) PCT Pub. No.: WO2017/131734
PCT Pub. Date: Aug. 3, 2017

(65) Prior Publication Data
US 2018/0219414 A1    Aug. 2, 2018

(51) Int. Cl.
*H02J 50/05* (2016.01)
*G06F 1/16* (2006.01)
(Continued)

(52) U.S. Cl.
CPC ............. *H02J 50/05* (2016.02); *G06F 1/162* (2013.01); *G06F 1/26* (2013.01); *H02J 7/0042* (2013.01);
(Continued)

(58) Field of Classification Search
CPC ............ H02J 5/005; H02J 7/025; H02J 17/00; H02N 2/008; H04B 5/0025–5/0093;
(Continued)

(56) References Cited

U.S. PATENT DOCUMENTS

| 5,901,035 A | 5/1999 | Foster et al. |
| 7,502,222 B2 | 3/2009 | Cheng et al. |

(Continued)

FOREIGN PATENT DOCUMENTS

| CN | 203102087 U | 7/2013 |
| WO | WO-2015065467 A1 | 5/2015 |

OTHER PUBLICATIONS

Edwards, L., "Dell's Latitude Z Introduces Wireless Charging", Sep. 30, 2009.

*Primary Examiner* — Rexford N Barnie
*Assistant Examiner* — Thai H Tran
(74) *Attorney, Agent, or Firm* — HPI Patent Department (57) ABSTRACT

Examples disclosed herein provide an electronic device to allow wireless charging of the electronic device when it is operated in various operation modes. The electronic device can include a base member comprising a top surface and a bottom surface opposite the top surface and a display member rotatably connected to the base member. The electronic device can include a rechargeable battery and a receiver to wirelessly charge the rechargeable battery when the bottom surface of the base member is to be placed atop a transmitter. As an example, the bottom surface of the base member is to remain atop the transmitter while the electronic device is in different operation modes.

15 Claims, 5 Drawing Sheets

(51) Int. Cl.
*G06F 1/26* (2006.01)
*H02J 50/10* (2016.01)
*H02J 7/00* (2006.01)
*H02J 7/02* (2016.01)
*H04B 1/3883* (2015.01)
*H02J 50/00* (2016.01)

(52) U.S. Cl.
CPC .............. *H02J 7/025* (2013.01); *H02J 50/00* (2016.02); *H02J 50/10* (2016.02); *H04B 1/3883* (2013.01)

(58) Field of Classification Search
CPC .... B60L 5/005; B60L 11/182; B60L 11/1829; B60L 11/1831; Y02T 90/122; H01F 27/006; H01F 27/02; H01F 38/14; H01F 2038/143–2038/146; H01R 13/6633; A61B 1/00029; A61N 1/3787

USPC .......................................... 307/104; 320/108
See application file for complete search history.

(56) References Cited

U.S. PATENT DOCUMENTS

| | | | |
|---|---|---|---|
| 2005/0052831 A1* | 3/2005 | Chen | G06F 1/1616 361/679.11 |
| 2007/0085822 A1 | 4/2007 | Lagnado | |
| 2009/0053590 A1 | 2/2009 | Yamaguchi | |
| 2009/0212636 A1 | 8/2009 | Cook et al. | |
| 2011/0110670 A1 | 5/2011 | Lee et al. | |
| 2012/0033363 A1 | 2/2012 | Wang-Hung | |
| 2013/0229063 A1 | 9/2013 | Tsai | |
| 2015/0222138 A1 | 8/2015 | Amano et al. | |
| 2017/0040828 A1* | 2/2017 | Carlson | H02J 7/025 |

* cited by examiner

ELECTRONIC DEVICES FOR WIRELESS CHARGING

BACKGROUND

Wireless power transfer is the transmission of electrical power from a power source to a consuming device, all without using solid wires or conductors. Wireless transmission includes the ability to power electronic or electrical devices by a number of different power transmission technologies that use electromagnetic fields. In wireless power transfer, a transmitter device connected to a power source generally transmits power by electromagnetic fields across an intervening space to receiver devices, where it is then converted back to electric power & utilized. As an example, the effective charging area or wireless range for powering receiver devices may be limited to the dimensions of the transmitter device itself.

DETAILED DESCRIPTION

Examples disclosed herein provide the ability to wirelessly charge an electronic device, all while the electronic device is used in various operation modes. The electronic device may include a rechargeable battery to provide power during use and, as will be further described, the rechargeable battery of the electronic device may be wirelessly charged via a transmitter. In order for the transmitter to wirelessly charge the electronic device, the electronic device may include a receiver to convert electromagnetic fields from the transmitter back to electric power and utilized by the electronic device to keep the rechargeable battery charged. As the effective charging area or wireless range for wirelessly charging the electronic device may be limited to the dimensions of a transmitter device, it is important for the receiver of the electronic device to remain within the effective charging area of the transmitter in order to wirelessly charge the electronic device continuously while it is being used in various operation modes.

Figure 1:
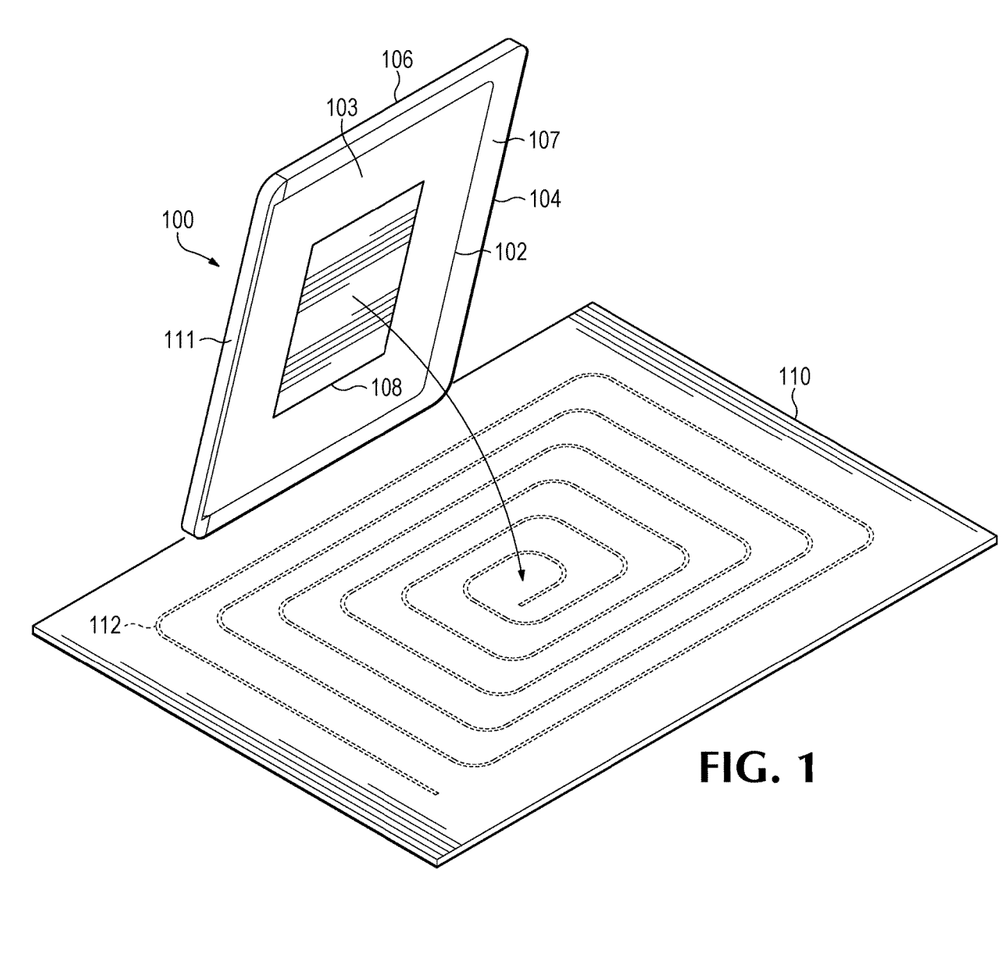
FIG. 1 includes a system illustrating a bottom surface of an electronic device and a charging mat, according to an example.

With reference to the figures, FIG. 1 includes a system illustrating a bottom surface of an electronic device 100 (in this case a tablet) and a charging mat 110, according to an example. Disposed within the charging mat 110 is a transmitter 112 that may be used for wirelessly charging the electronic device 100, as mentioned above. For example, the electronic device 100 may include a rechargeable battery (not illustrated) and a receiver 108 coupled to the rechargeable battery. Once the bottom surface of the electronic device 100 is placed atop the transmitter 112 (indicated by the arrow and also illustrated in FIG. 2), the receiver 108 may convert electromagnetic fields from the transmitter 112 to electric power, which may then be used to keep the rechargeable battery of the electronic device 100 charged. As an example, the charging mat 110 may utilize any of a variety of different technologies to charge the rechargeable battery including, without limitation, magnetic resonance (e.g., the Alliance for Wireless Power (A4WP)), inductive coupling, or capacitive coupling.

Figure 2:
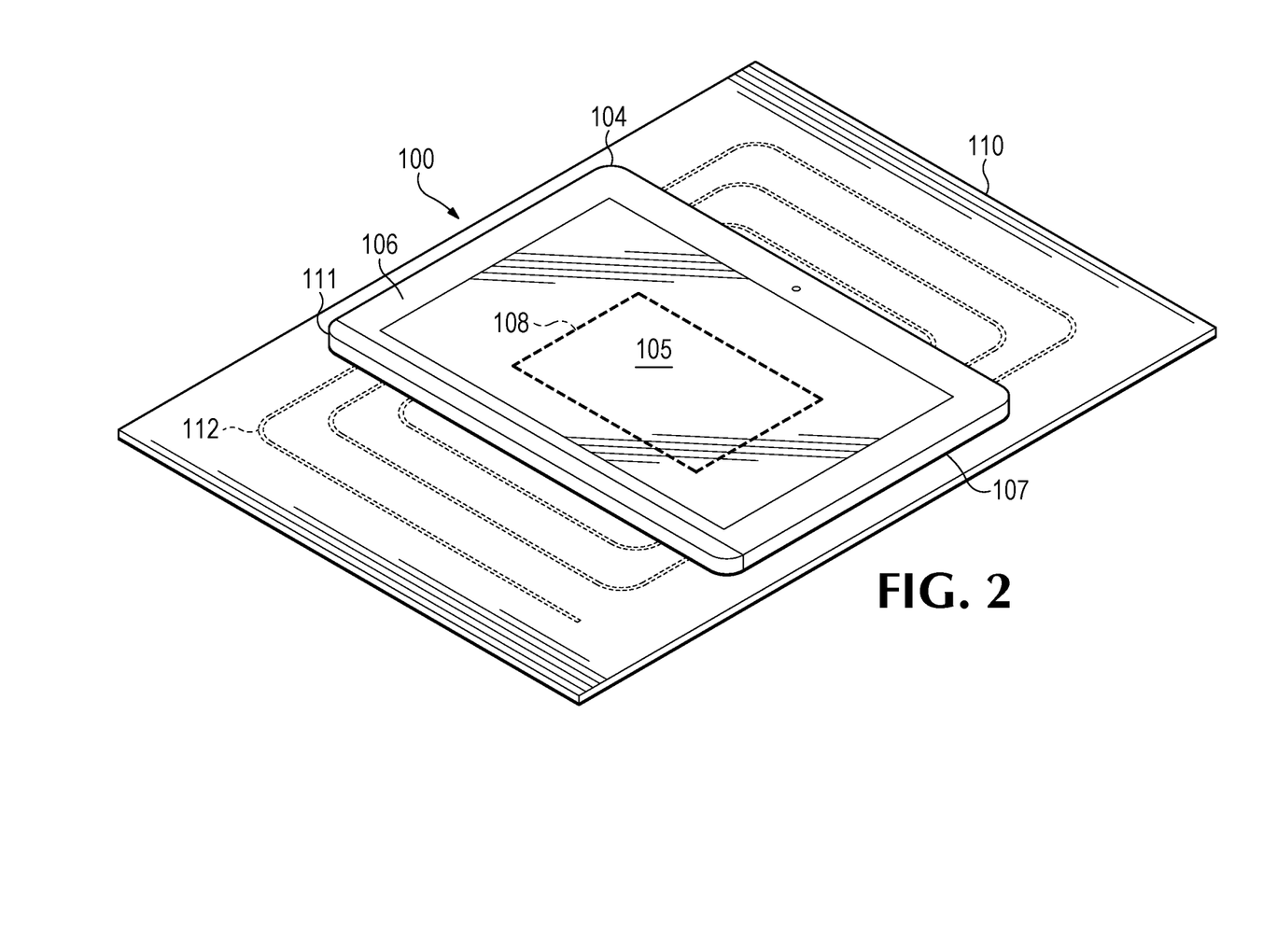
FIG. 2 illustrates a front view of the electronic device in a tablet mode, according to an example.

A front view of an example of the electronic device 100 is shown in FIG. 2. As can be seen in FIG. 2, electronic device 100 includes a housing or a display member 104 having a first side 106 and a second side 107. In this example of electronic device 100, first side 106 is opposite second side 107. Also in this example, first side 106 is the front surface of electronic device 100 and second side 107 is the back surface of electronic device 100. Electronic device 100 includes a display surface 105 on the first side 106 of the display member 104 and a rechargeable battery (not illustrated) to power electronic device 100. As can also be seen in FIG. 2, electronic device 100 includes the receiver 108 that is coupled to the rechargeable battery. As described above, the receiver 108 may utilize any of a variety of different technologies to charge the rechargeable battery including, without limitation, magnetic resonance (e.g., the Alliance for Wireless Power (A4WP)), inductive coupling, or capacitive coupling.

As an example, while the electronic device 100 is used in various operation modes, as will be further described below, the receiver 108 may remain within the effective charging area of the transmitter 112, in order to continue wireless charging of the electronic device 100. In order to facilitate the ability to operate the electronic device 100 in the various operation modes and be continuously charged, the receiver 108 may be disposed within a base member 102 that is rotatably connected to the display member 104. As an example, the base member 102 is moveable between a retracted position and an extended position.

With regards to the retracted position, shown in FIGS. 1-2, the base member 102 may be inserted or enclosed within a cavity or recess in a portion of the back surface 107 so as to be substantially flush with the back surface 107 (e.g., see FIG. 1). Having the base member 102 substantially flush with back surface 107 of the display member 104 in the retracted position helps to prevent the base member 102 from being inadvertently moved to the extended position which may occur if the base member 102 were on the outside of back surface 107, where the base member 102 could catch on an item or object. Having the base member 102 substantially flush with the back surface 107 of the display member 104 also allows electronic device 100 to have a thinner width than would otherwise be possible if the base member 102 were on the outside of back surface 107. This thinner width may be perceived as a benefit to some end users because it allows the electronic device 100 to be more easily handled, stored, and/or transported.

Figure 3:
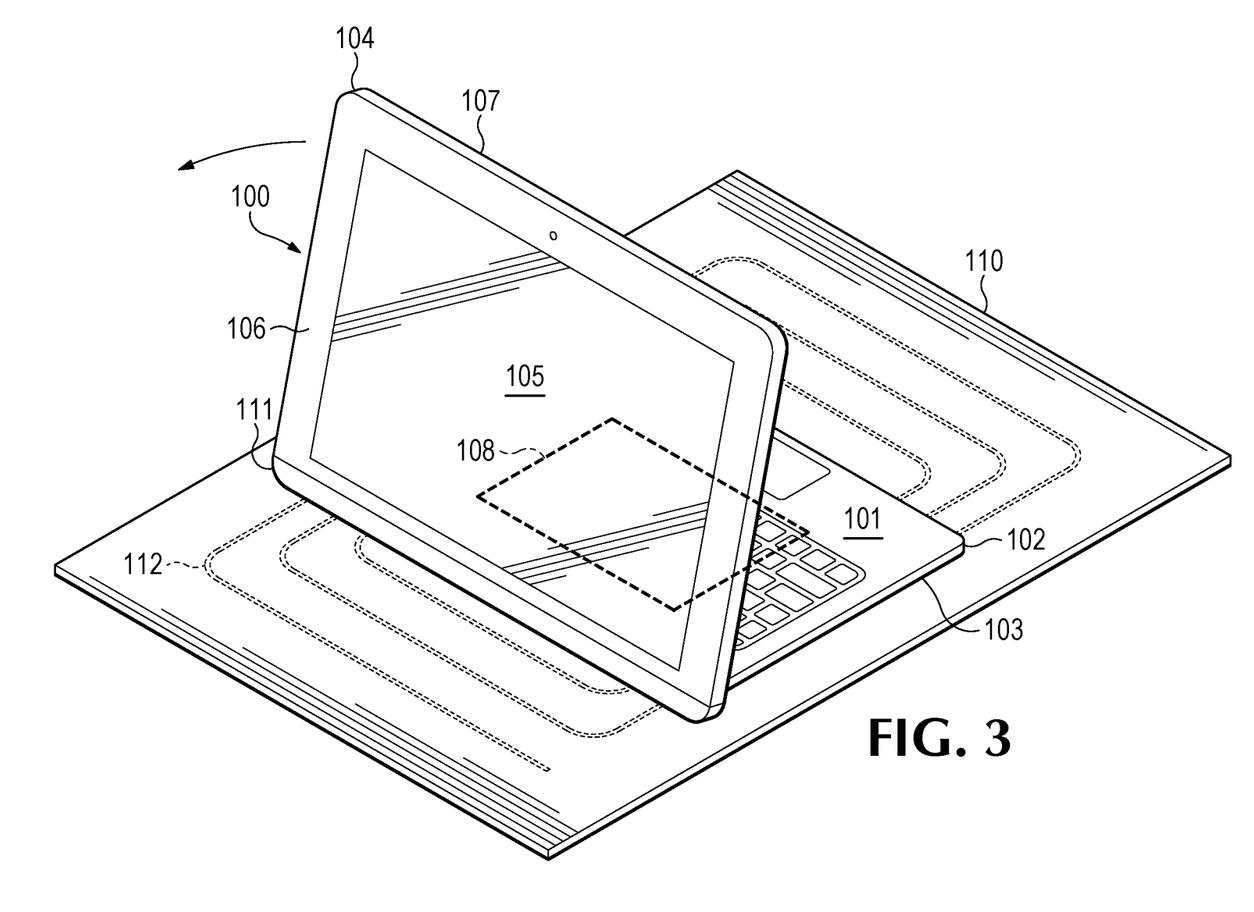
FIG. 3 illustrates the electronic device in a stand mode, according to an example.

With regards to the extended position, shown in FIG. 3, the base member 102 is moveable out of the cavity in the portion of the back surface 107 to provide a stand to the display member 104 to allow the display surface 105 to be utilized during charging of the rechargeable battery via the receiver 108 remaining within the effective charging area or wireless range of the transmitter 112. As an example, the rechargeable battery may be disposed within the base member 102 and occupy a large portion of the base member 102, for example, in order to provide a longer battery life. By occupying a large portion of the base member 102, the rechargeable battery may help to provide weight and stability to the base member 102 when it is in the extended position, providing for a satisfactory user experience while operating the electronic device 100.

As an example, the electronic device 100 may also include a hinge assembly 111 to couple or rotatably connect the display member 104 and the base member 102. The hinge assembly 111 allows the base member 102 to be moved from the retracted position shown, for example, in FIG. 2, to the extended position shown, for example, in FIG. 3. For example, the display member 104 may be rotatably connected to the base member 102 via a torqued hinge. The torqued hinge may help to retain the base member 102 in the extended position. As an example, the torqued hinge includes torsion springs.

Figure 4:
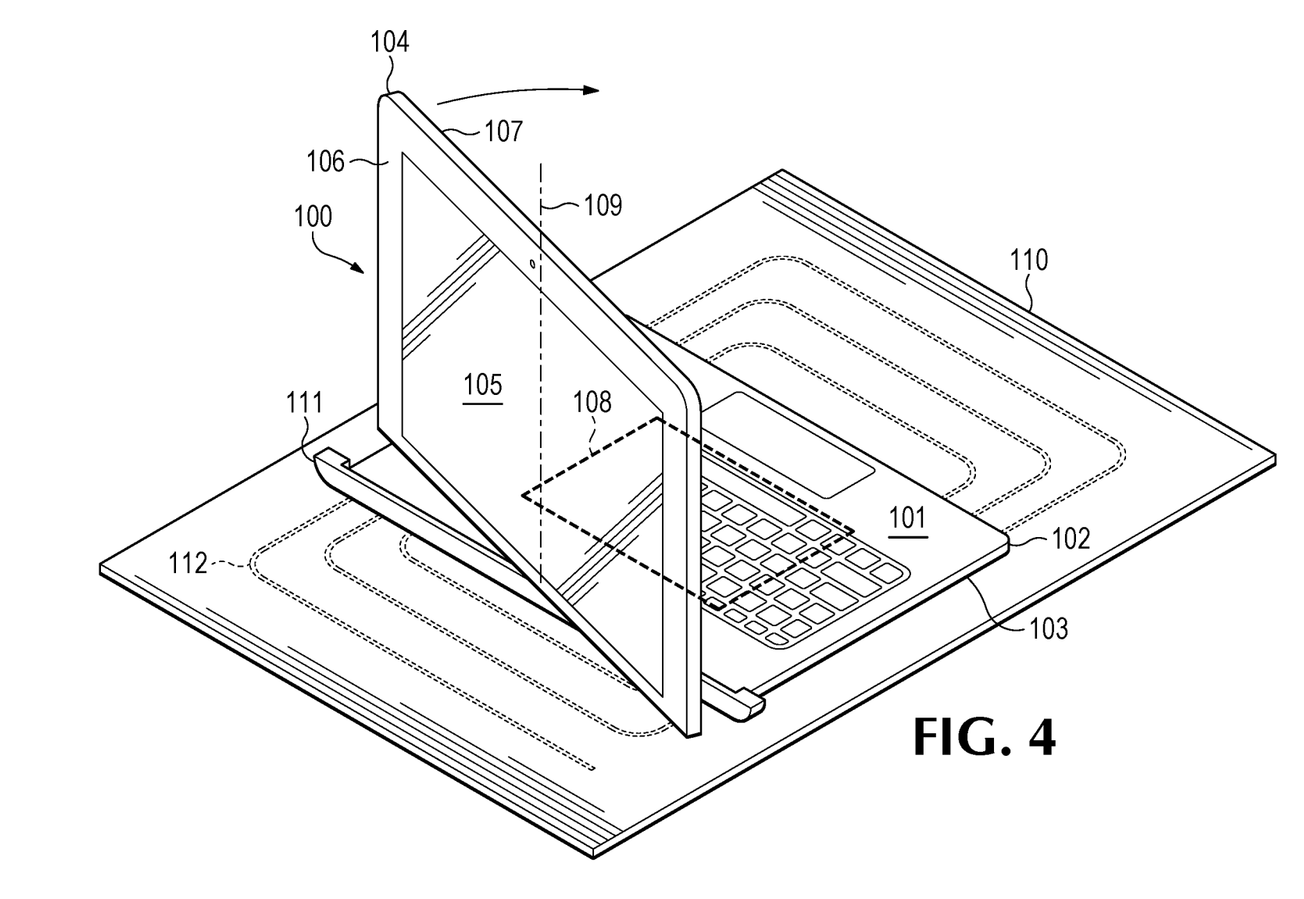
FIG. 4 illustrates the electronic device transitioning between a first and second operation mode, according to an example.
Figure 5:
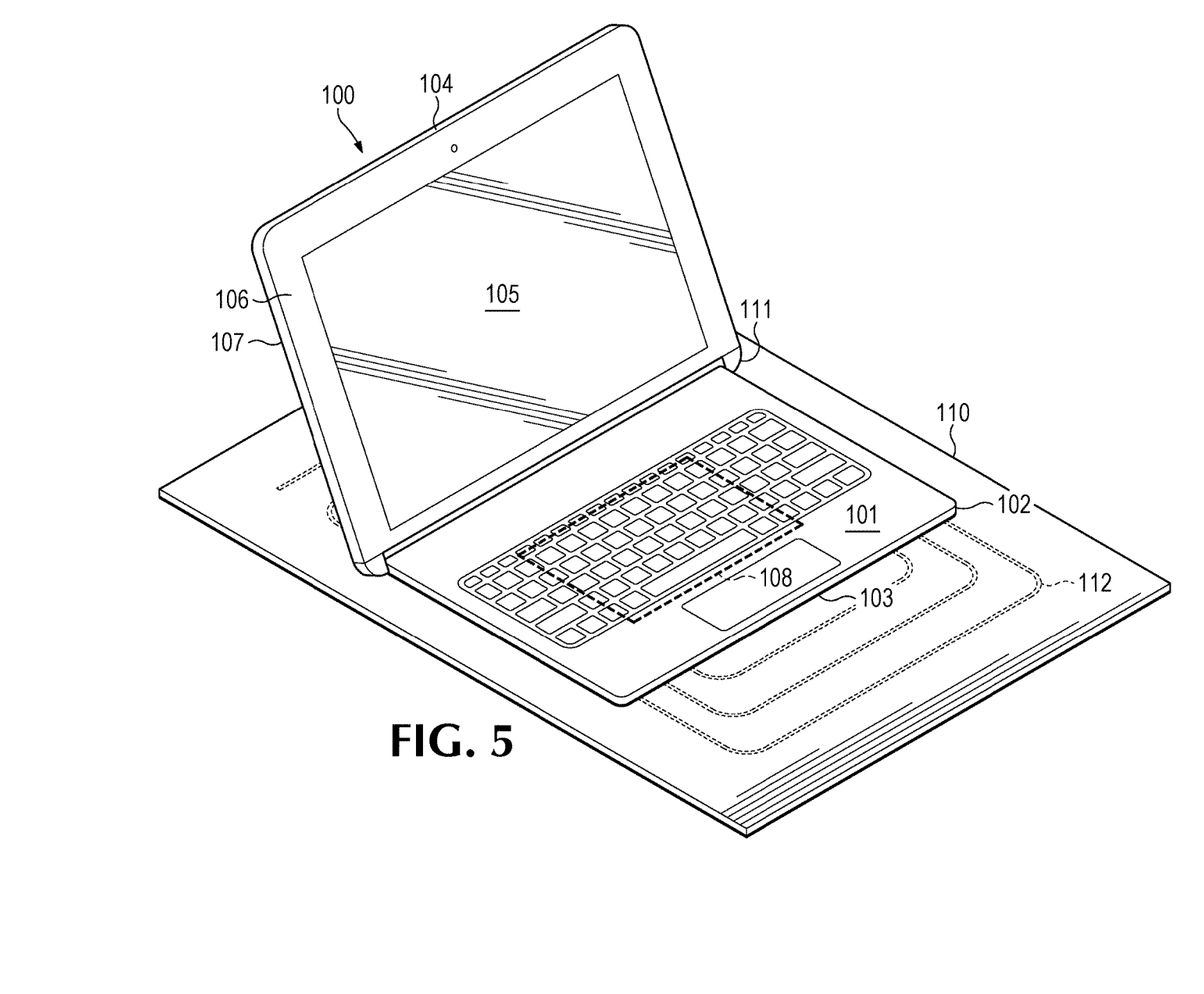
FIG. 5 illustrates the electronic device in a clamshell mode, according to an example.

In addition to the operation modes illustrated in FIGS. 2-3, the electronic device 100 may also be operated in a clamshell mode (e.g., see FIG. 5), while allowing for the receiver 108 to continue to remain within the effective charging area of the transmitter 112. As an example, the base member 102 includes a top surface 101 and a bottom surface 103 opposite the top surface 101, and the top surface 101 includes peripheral devices for inputting information into the electronic device 100, as illustrated in the figures (e.g., keyboard and trackpad). Referring to FIG. 4, in order to transition from a first operation mode, for example, as illustrated in FIG. 3, to a second operation mode, such as the clamshell mode, the display member 104 may swivel around an axis 109 perpendicular to the base member 102, in order for the display surface 105 to face in a direction towards the top surface 101 of the base member 102, as illustrated in FIG. 5. As an example, the hinge assembly 111 may include capabilities to allow for the display member 104 to swivel around the axis 109. With the display surface 105 facing in a direction towards the top surface 101 of the base member 102, a user may then be able to use the peripheral devices disposed on the top surface 101 to operate the electronic device 100 in clamshell mode.

Referring to the first, second, and third operation modes illustrated in FIGS. 2, 3, and 5, respectively, the bottom surface 103 of the base member 102 remains atop the transmitter 112, allowing for the receiver 108 disposed within the base member 102 to remain within the effective charging area of the transmitter 112. By remaining within the effective charging area of the transmitter 112, the receiver 108 is able to keep the electronic device 100 continuously charged. For example, in the tablet mode illustrated in FIG. 2, the back surface 107 of the display member 104 faces in a direction towards the top surface 101 of the base member 102, allowing for the bottom surface 103 of the base member 102 to remain atop the transmitter 112. In the stand mode illustrated in FIG. 3, when the base member 102 is moveable out of the cavity in the portion of the back surface 107 of the display member 104, to provide a stand to the display member 104, the bottom surface 103 of the base member 102 to continues to remain atop the transmitter 112. Finally, in the clamshell mode illustrated in FIG. 5, after swiveling the display member 104 so that the display surface 105 faces in a direction towards the top surface 101 of the base member 102, the bottom surface 103 of the base member 102 to also continues to remain atop the transmitter 112, allowing for the receiver 108 to continuously keep the electronic device 100 charged in its various operation modes.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An electronic device comprising:
   a base member comprising a top surface and a bottom surface opposite the top surface;
   a display member comprising a display surface along a front surface of the display member and rotatably connected to the base member, wherein a back surface of the display member opposite the front surface is to face directly towards the top surface of the base member in a first operation mode, and wherein the display surface is to face directly towards the top surface of the base member in a second operation mode;
   a rechargeable battery; and
   a receiver to wirelessly charge the rechargeable battery when the bottom surface of the base member is to be placed atop a transmitter emitting electromagnetic fields, wherein the bottom surface of the base member is to remain atop the transmitter while in the first and second operation modes, and wherein the receiver is to convert the electromagnetic fields from the transmitter to electric power to charge the rechargeable battery.

2. The electronic device of claim 1, wherein the top surface of the base member comprises peripheral devices for inputting information into the electronic device.

3. The electronic device of claim 1, wherein when the electronic device is to transition between the first and second operation modes, the display member is to swivel around an axis perpendicular to the top surface of the base member.

4. The electronic device of claim 1, wherein the rechargeable battery is disposed within the base member.

5. The electronic device of claim 1, wherein, when the electronic device is in the first operation mode, the base member is enclosed within a cavity along the back surface of the display member.

6. The electronic device of claim 1, wherein the display member is rotatably connected to the base member via a torqued hinge.

7. The electronic device of claim 1, wherein the receiver is disposed along the bottom surface of the base member.

8. An electronic device comprising:
   a base member comprising a top surface and a bottom surface opposite the top surface;
   a display member comprising a display surface along a front surface of the display member and rotatably connected to the base member, wherein the display member is to swivel around an axis perpendicular to the top surface of the base member when the electronic device is to transition from a first operation mode to a second operation mode;

a rechargeable battery; and a receiver to wirelessly charge the rechargeable battery when the bottom surface of the base member is to be placed atop a transmitter emitting electromagnetic fields, wherein the bottom surface of the base member is to remain atop the transmitter while in the first and second operation modes, and wherein the receiver is to convert the electromagnetic fields from the transmitter to electric power to charge the rechargeable battery.

9. The electronic device of claim 8, wherein a back surface of the display member opposite the front surface is to face directly towards the top surface of the base member in the first operation mode, and wherein the display surface is to face directly towards the top surface of the base member in the second operation mode.

10. The electronic device of claim 8, wherein the rechargeable battery is disposed within the base member.

11. The electronic device of claim 8, wherein, when the electronic device is in the first operation mode, the base member is enclosed within a cavity along a back surface of the display member.

12. A system comprising:

a charging mat comprising a transmitter emitting electromagnetic fields for wireless charging; and an electronic device comprising:
a base member comprising a top surface and a bottom surface opposite the top surface;
a display member comprising a display surface along a front surface of the display member and rotatably connected to the base member, wherein a back surface of the display member opposite the front surface is to face directly the top surface of the base member in a first operation mode, and wherein the display surface is to face directly towards the top surface of the base member in a second operation mode;
a rechargeable battery; and
a receiver to wirelessly charge the rechargeable battery when the bottom surface of the base member is to be placed atop the transmitter, wherein the bottom surface of the base member is to remain atop the transmitter while in the first and second operation modes, and wherein the receiver is to convert the electromagnetic fields from the transmitter to electric power to charge the rechargeable battery.

13. The system of claim 12, wherein when the electronic device is to transition between the first and second operation modes, the display member is to swivel around an axis perpendicular to the top surface of the base member.

14. The system of claim 12, wherein the rechargeable battery is disposed within the base member.

15. The system of claim 12, wherein, when the electronic device is in the first operation mode, the base member is enclosed within a cavity along the back surface of the display member.

* * * * *

UNITED STATES PATENT AND TRADEMARK OFFICE
CERTIFICATE OF CORRECTION

PATENT NO. : 10,355,524 B2  
APPLICATION NO. : 15/748380  
DATED : July 16, 2019  
INVENTOR(S) : Monji G Jabori et al.

Page 1 of 1

It is certified that error appears in the above-identified patent and that said Letters Patent is hereby corrected as shown below:

On the Title Page

In item (73), Assignee, in Column 1, Line 1, delete "Hewiett-Packard" and insert
-- Hewlett-Packard --, therefor.

Signed and Sealed this
Fifth Day of November, 2019

Andrei Iancu
*Director of the United States Patent and Trademark Office*